P. HATCH.
CORN PLANTER.
No. 20,639.                                    Patented June 22, 1858.
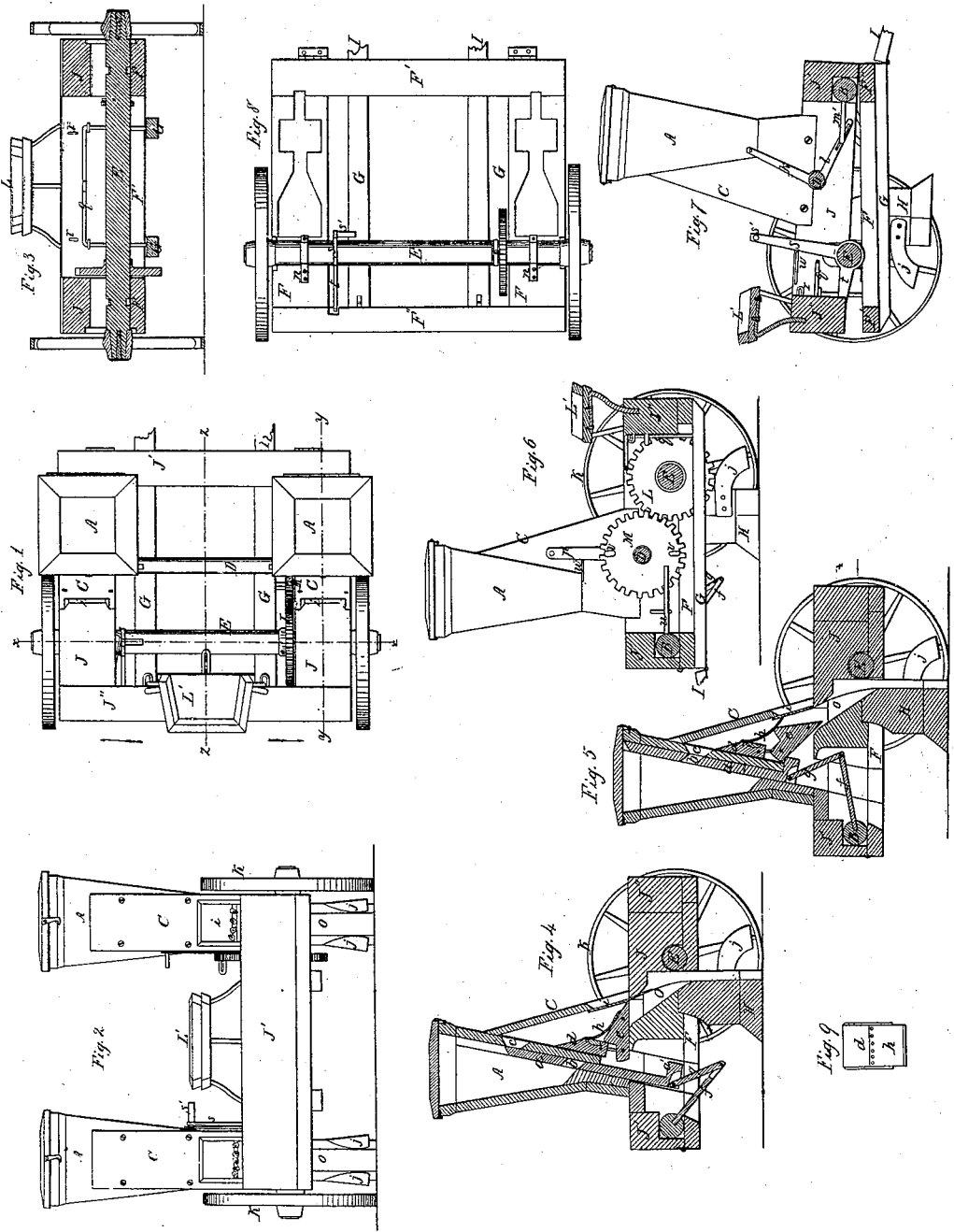

UNITED STATES PATENT OFFICE.

P. HATCH, OF NORWICH, VERMONT.

IMPROVEMENT IN CORN-PLANTERS.

Specification forming part of Letters Patent No. 20,639, dated June 22, 1858.

*To all whom it may concern:*

Be it known that I, PASCAL HATCH, of Norwich, in the county of Windsor and State of Vermont, have invented a new and Improved Corn-Planter; and I do hereby declare that the following is a full and exact description thereof, reference being had to the accompanying drawings, making a part of this specification—

Figure 1 being a top view of said invention; Fig. 2, a rear view of the same; Fig. 3, a section in the line $x\,x$ of Fig. 1; Figs. 4 and 5, sections in the line $y\,y$ of Fig. 1, representing the same parts in different positions; Figs. 6 and 7, opposite sectional views in the line $z\,z$ of Fig. 1; Fig. 8, a top view of the running-gear of the machine detached from the body of the same, and Fig. 9 is a view of a detached portion of the machine.

Similar letters indicate like parts in each of the drawings.

Planting-machines operated by horse-power have not as yet been used to any considerable extent, for the reason that the superintendent has no means of ascertaining whether his machine does or does not perform its work with uniform faithfulness.

To remedy this serious defect in planting-machines is the object of my present invention, and this I do by means of a glazed receptacle, C, immediately in the rear of each grain-box A of my improved planter, in connection with other apparatus so arranged and operated that the proper number of kernels of corn for each planting-charge will first be deposited in said receptacles and remain there in plain view of the superintendent during the interval between each movement which deposits a charge of corn in the ground; or, in other words, the same movement which deposits a charge of corn in the ground from the said glazed receptacles also conveys the same number of kernels from the grain-boxes into said receptacles for the succeeding planting operation.

This my said improvement may be adapted to a very great variety of corn-planters.

The accompanying drawings represent a corn-planter whose operative parts are combined with the rectangular frame $J\,J\,J'\,J''$, the transverse shafts B D, which are combined with said frame, and the axle E of the bearing-wheels K K.

The grain-boxes A A rise from the sides J J of the frame, and each of said boxes is combined with its glazed planting-receptacle C by means of an aperture, $c$, as shown in Fig. 4. The rear side of each grain-box A is covered by a sliding slat, $a$, whose lower end passes through an aperture in the bottom of said box, and is connected with the oscillating shaft B by means of the lever $f$ and the pitman $g$, as shown in Fig. 4. Each sliding slat $a$ has an aperture, $b$, whose size is such that it will contain the desired number of kernels for a planting-charge, and the said aperture is so situated that when the said slat is thrown into its extreme elevated position its aperture will be exactly opposite the aperture $c$ in the rear side of the grain-box, and consequently the charge of corn carried upward in the first-mentioned aperture, $b$, will at the same moment be discharged into the planting-receptacle C.

The bottom of each planting-receptacle is closed and opened in the following manner, viz: A block, $d$, having lateral flanges or ears, works loosely in guiding-grooves in the sides of each of the planting-receptacles, and the said blocks have a sufficient degree of gravity, when left to themselves, to throw the pivoted blocks $e\,e$, to which they (the first-mentioned blocks) are loosely jointed, into the proper position for closing the eduction-apertures of the said planting-receptacles, as shown in Fig. 4. The flap $h$, which is combined with each block $d$, is of such a size and shape that when the blocks $d\,e$ are in such a position that the latter block will close the outlet of the planting-receptacle with which it is combined the said flap will throw the kernels of corn which may fall onto it outward into the angle between the inclined point of the block $e$ and the pane of glass $i$, which closes a portion of the rear side of the said planting-receptacle, where the said kernels will be in full view of the operator of the machine when seated in the chair L' at the rear end of the same. Just before the slat $a$ in each receptacle C reaches its highest position the shoulder $a'$, at the lower end of the same, strikes against the block $e$, and thereby throws the blocks $d$ and $e$ into the position shown in Fig. 5, which movement will discharge the kernels of corn resting on the point of the block $e$ into the channel $o$ in the plow H, and at the same instant the lower extremity of the flap $h$ will be thrown outward against the pane of glass $i$ for the purpose of arresting the descent of the kernels of corn, which at about the same moment are discharged into each planting-receptacle from the apertures in each sliding slat $a$, and the descent of the said sliding slats will enable the gravity of the blocks $d$ to throw the blocks $e$ into the position for closing the eduction-openings of the planting-receptacles, as shown in Fig. 4, until the next upward movement of said slats.

The oscillating movement of the shaft B, which produces the reciprocating movements of the slats $a$, is produced in the following manner, viz: The toothed wheel L on the axle E is geared to the toothed wheel M on the shaft D and imparts a rotary movement thereto. The rounded projections $v\ v$ on the face of the wheel M strike in succession against the lever $u$, which projects from the shaft B, and the moment that the said lever is elevated to the desired height the said projections pass from under it, and the weight of the two sliding slats $a\ a$ is sufficient to cause them instantly to descend and replace the shaft B in the position shown in Fig. 4. The collar of the angular hand-lever $k\ l$ works loosely upon the end of the shaft D, and the leg $l$ of said lever is jointed to the lever $m'$, which projects from the oscillating shaft B. The leg $k$ of the said lever being within convenient reach of the operator when seated in the chair L' enables him to operate the planting apparatus temporarily by hand in case any accident should happen to the machinery. The journal-box at one end of the shaft D is combined with the lever $p$, which enables the operator to throw the said shaft out of gear with the axle E whenever it may be necessary or expedient to do so, and the spring-catch $w$ will catch and retain the said shaft in its ungeared position until it is detached therefrom by the operator.

Planting-plows H H, or planting-tubes of any desired pattern for receiving the kernels of corn from the planting-receptacles and depositing the same in the ground, may be combined with the frame of the planter and with the operative portions thereof in any suitable and proper manner.

The accompanying drawings represent the frame of the planter as being hinged at its forward end to an auxiliary frame, F F F' F'', placed beneath the axle E, and combined therewith by means of the straps $n\ n$. By means of the angular lever $s\ t$, whose collar plays loosely upon the axle E, and whose horizontal leg $t$ passes under the rear side of the frame of the planter, the operator can at will elevate the after end of said frame to such a height as to withdraw the planting-plows from the ground and retain them at such an elevation that the machine may be transported from place to place without danger of injuring said plows or the apparatus combined with them.

The guiding-shafts I I are hinged to the forward end of the frame F F F' F'', and a couple of rearwardly-extending shafts, G G, are also hinged to the front bar of said frame, which can be forced downward by means of the handle $q$ for the purpose of regulating the depth of the furrows formed by the planting-plows.

What I claim as my invention, and desire to secure by Letters Patent, is—

Combining the glazed receptacles C C with the grain-boxes A A, and with the delivering apparatus connected therewith, when the said parts are constructed, arranged, and operated substantially in the manner and for the purpose set forth.

The above specification of my improvement in corn-planters signed and witnessed this 3d day of March, 1858.

PASCAL HATCH.

Witnesses:
FRANKLIN L. OLDS,
R. E. BEAN.